United States Patent
Dostert et al.

(10) Patent No.: US 7,523,196 B2
(45) Date of Patent: Apr. 21, 2009

(54) SESSION MONITORING USING SHARED MEMORY

(75) Inventors: Jan Dostert, Nussloch (DE); Christian Fleischer, Mannheim (DE); Frank Kilian, Mannheim (DE); Georgi Stanev, Sofia (BG); Randolf Werner, Wiesloch-Baiertal (DE)

(73) Assignee: SAP AG, Walldorf (DE)

( * ) Notice: Subject to any disclaimer, the term of this patent is extended or adjusted under 35 U.S.C. 154(b) by 804 days.

(21) Appl. No.: 11/024,391

(22) Filed: Dec. 28, 2004

(65) Prior Publication Data

US 2006/0143290 A1 Jun. 29, 2006

(51) Int. Cl.
*G06F 15/16* (2006.01)

(52) U.S. Cl. .................... 709/224; 709/220; 709/223; 709/245; 715/734; 715/736

(58) Field of Classification Search ................ 709/220, 709/223, 224, 245; 715/734, 736
See application file for complete search history.

(56) References Cited

U.S. PATENT DOCUMENTS

| | | | |
|---|---|---|---|
| 5,566,302 A | 10/1996 | Khalidi et al. | |
| 5,682,328 A | 10/1997 | Roeber et al. | |
| 5,745,778 A | 4/1998 | Alfieri | |
| 5,905,868 A | 5/1999 | Baghai et al. | |
| 5,951,643 A * | 9/1999 | Shelton et al. | ............... 709/227 |
| 6,115,712 A | 9/2000 | Islam et al. | |
| 6,115,721 A | 9/2000 | Nagy | |
| 6,336,170 B1 | 1/2002 | Dean et al. | |
| 6,415,364 B1 | 7/2002 | Bauman et al. | |
| 6,467,052 B1 | 10/2002 | Kaler et al. | |
| 6,615,253 B1 | 9/2003 | Bowman-Amuah | |
| 6,640,244 B1 | 10/2003 | Bowman-Amuah | |
| 6,687,702 B2 | 2/2004 | Vaitheeswaran et al. | |
| 6,760,911 B1 | 7/2004 | Ye | |
| 6,772,409 B1 | 8/2004 | Chawla et al. | |
| 6,795,856 B1 * | 9/2004 | Bunch | ........................ 709/224 |
| 7,089,566 B1 | 8/2006 | Johnson | |
| 7,124,170 B1 | 10/2006 | Sibert | |

(Continued)

FOREIGN PATENT DOCUMENTS

EP          0 459 931 A2     12/1991

(Continued)

OTHER PUBLICATIONS

"FOA Mailed Aug. 17, 2007 for U.S. Appl. No. 11/013,277", Whole Document.

(Continued)

*Primary Examiner*—Jinsong Hu
(74) *Attorney, Agent, or Firm*—Blakley Sokoloff Taylor & Zafman

(57) ABSTRACT

A system and method to monitor client sessions within a Java virtual machine. Client sessions are established within an application server instance to store session context data for each of the client sessions during the client sessions. At least two Java virtual machines are operated within the application server instance to service client requests received from clients associated with each of the client sessions. Status information about each of the client sessions is reported into shared memory external to the Java virtual machines to monitor each of the client sessions during operation of the Java virtual machines.

20 Claims, 6 Drawing Sheets

U.S. PATENT DOCUMENTS

| | | | |
|---|---|---|---|
| 7,149,741 | B2 | 12/2006 | Burkey et al. |
| 7,155,512 | B2* | 12/2006 | Lean et al. .................. 709/224 |
| 7,194,761 | B1* | 3/2007 | Champagne ................... 726/6 |
| 7,418,560 | B2 | 8/2008 | Wintergerst |
| 2001/0029520 | A1 | 10/2001 | Miyazaki |
| 2002/0083166 | A1 | 6/2002 | Dugan et al. |
| 2002/0174097 | A1 | 11/2002 | Rusch et al. |
| 2002/0181307 | A1 | 12/2002 | Fifield et al. |
| 2003/0009533 | A1 | 1/2003 | Shuster |
| 2003/0014521 | A1 | 1/2003 | Elson et al. |
| 2003/0014552 | A1 | 1/2003 | Vaitheeswaran et al. |
| 2003/0028671 | A1* | 2/2003 | Mehta et al. ................. 709/245 |
| 2003/0037178 | A1 | 2/2003 | Vessey et al. |
| 2003/0084248 | A1 | 5/2003 | Gaither et al. |
| 2003/0088604 | A1 | 5/2003 | Kuck et al. |
| 2003/0097360 | A1 | 5/2003 | McGuire et al. |
| 2003/0105887 | A1 | 6/2003 | Cox et al. |
| 2003/0115190 | A1 | 6/2003 | Soderdtrom et al. |
| 2003/0131286 | A1 | 7/2003 | Kaler et al. |
| 2003/0177382 | A1 | 9/2003 | Ofek et al. |
| 2003/0191795 | A1 | 10/2003 | Bernardin et al. |
| 2003/0196136 | A1 | 10/2003 | Haynes |
| 2003/0212654 | A1 | 11/2003 | Harper et al. |
| 2004/0024610 | A1 | 2/2004 | Fradkov et al. |
| 2004/0024971 | A1 | 2/2004 | Bogin et al. |
| 2004/0045014 | A1 | 3/2004 | Radhakrishnan |
| 2004/0187140 | A1 | 9/2004 | Aigner et al. |
| 2005/0044301 | A1 | 2/2005 | Vasilevsky et al. |
| 2005/0060704 | A1 | 3/2005 | Bulson et al. |
| 2005/0160396 | A1 | 7/2005 | Chadzynski |
| 2005/0262181 | A1 | 11/2005 | Schmidt et al. |
| 2006/0059453 | A1 | 3/2006 | Kuck et al. |
| 2006/0070051 | A1 | 3/2006 | Kuck et al. |
| 2006/0094351 | A1 | 5/2006 | Nowak et al. |
| 2006/0206856 | A1 | 9/2006 | Breeden et al. |
| 2007/0266305 | A1* | 11/2007 | Cong et al. .............. 715/500.1 |

FOREIGN PATENT DOCUMENTS

| | | |
|---|---|---|
| GB | 2365553 | 2/2002 |
| WO | WO-00/23898 | 4/2000 |

OTHER PUBLICATIONS

"OA Mailed Jan. 7, 2008 for U.S. Appl. No. 11/013,277", Whole Document.

"OA Mailed Mar. 12, 2007 for U.S. Appl. No. 11/013,277", Whole Document.

"FOA Mailed Aug. 17, 2007 for U.S. Appl. No. 11/013,278", Whole Document.

"OA Mailed Feb. 5, 2008 for U.S. Appl. No. 11/013,278", Whole Document.

"OA Mailed Mar. 16, 2007 for U.S. Appl. No. 11/013,278", Whole Document.

"FOA Mailed Aug. 28, 2007 for U.S. Appl. No. 11/012,803", Whole Document.

"OA Mailed Jan. 24, 2008 for U.S. Appl. No. 11/012,803", Whole Document.

"OA Mailed Mar. 16, 2007 for U.S. Appl. no. 11/012,803", Whole Document.

"OA Mailed Jan. 24, 2008 for U.S. Appl. No. 11/024,393", Whole Document.

"FOA Mailed Dec. 11, 2007 for U.S. Appl. No. 11/118,259", Whole Document.

"OA Mailed Apr. 4, 2008 for U.S. Appl. No. 11/118,259", Whole Document.

"OA Mailed Jun. 11, 2007 for U.S. Appl. No. 11/118,259", Whole Document.

"EP 05027361, European Search Report", (Mar. 28, 2006), Whole Document.

USPTO, "OA Mailed Apr. 4, 2008 for U.S. Appl. No. 11/024,392", Whole Document.

Casavant, T. L., et al., ""A Taxonomy of Scheduling in General-Purpose Distributed Computing Systems"", *Casavant, T.L., and Kuhl, J.G., "A Taxonomy of Scheduling in General-Purpose Distributed Computing Systems," IEEE 14(2):141-154, (1988) XP000039761.*, (1988), 141-154.

Dandamudi, S. P., "Reducing Run Queue Contention in Shared Memory Multipocessors", *Dandamudi, S.P., "Reducing Run Queue Contention in Shared Memory Multipocessors," IEEE pp. 82-89 (1997) XP000657329.*, (1997), 82-89.

Tanenbaum, A. S., "Multimedia Operating Systems", *Tanenbaum, A.S., Modern Operating Systems, 2nd Edition, Upper Saddle River, New Jersey: Prentice-Hall, Inc., pp. 531-578 (2001). English Translation of: Moderne Betriebssysteme, vol. 2, pp. 539-617, (2002) XP002385695.*, (2002), 539-617.

Yue, K. K., et al., "An Effective Processor Allocation Strategy for Multiprogrammed Shared-Memory Multiprocessors", *Yue, K. K. and Lilja, D.J., "An Effective Processor Allocation Strategy for Multiprogrammed Shared-Memory Multiprocessors," IEEE 8(12):1246-1258, (1997).*, (1997), 1246-1258.

Cheung, KC, et al., "Lightweight Trace and Interpreter for Interprocess Timing Problems", *IP. COM Journal, IP.COM Inc.*, West Henrietta, NY US, XP013096988, ISSN: 1533-0001, (Jun. 1, 1992), Whole Document.

EPO, "EP Search Report Mailed Jun. 4, 2008 for EP Patent Application 05027365.5-1225", Whole Document.

USPTO, "FOA Mailed Sep. 17, 2008 for U.S. Appl. No. 11/024,392", Whole Document.

Viswanathan, D., et al., "Java Virtual Machine Profiler Interface", *IBM Systems Journal IBM USA,* vol. 39, No. 1, XP002481425, ISSN: 0018-8670, (2000), 82-95.

Wolczko, Mario, "Using a Tracing Java Virtual Machine to Gather Data on the Behavior of Java Programs", *Internet Citation, XP002375976,* http://research.sun.com/people/mario/tracing-jvm/tracing.pdf, (Retrieved on Apr. 6, 2006), Whole Document.

\* cited by examiner

| SESSION STATUS INFO | DESCRIPTION |
| --- | --- |
| BS_NONE | /* session not persisted |
| BS_FILE | /* session saved to file system |
| BS_DATABASE | /* session serialized to database |
| BS_SHMEM | /* session serialized to shared memory |
| BS_SHCLOSURE | /* session copied to shared closure |
| SIZE | /* size of Java session (e.g., bytes, objects, etc.) |
| TIMEOUT | /* session timeout (seconds) |
| TOTAL_REQUESTS | /* total number of requests for the session |
| TOTAL_RESPONSES | /* total number of responses for the session |
| CREATION_TIME | /* creation timestamp |
| UPDATE_TIME | /* last update timestamp |
| SESSION_CORRUPT | /* boolean value to mark session as corrupt or /* not corrupt |
| SESSION_AVAILABLE | /* indicates whether session is open & available or /* closed & unavailable |
| USERNAME | /* name of client generating requests |
| SESSION_ID | /* session identification |

FIG. 4

SESSION MONITORING USING SHARED MEMORY

TECHNICAL FIELD

This disclosure relates generally to Java virtual machines, and in particular but not exclusively, relates to monitoring client sessions within a Java virtual machine of an application server.

BACKGROUND INFORMATION

Enterprise software has transformed the way diverse enterprises, large and small a like, transact and manage day-to-day operations. Businesses use enterprise software (e.g., web based application servers) to control production planning, purchasing and logistics, warehouse and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP NetWeaver, SAP xAPPs, mySAP Business Suite, etc.).

To integrate diverse hardware and software resources, developers of enterprise software have leveraged cross platform engines capable of minimizing or even severing platform dependencies from the enterprise solution. The Java 2 Platform, Enterprise Edition™ ("J2EE") (e.g., J2EE Specification, Version 1.4) is a Java based solution supported by the Java Virtual Machine ("JVM") engine. J2EE simplifies application development and decreases the need for programming and programmer training by creating standardized and reusable modular components. The popularity of Java based solutions is evident as the Information Technology ("IT") world has gravitated to the Java language.

As enterprise software is woven into the fabric of modern business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently, JVMs do not provide adequate mechanisms to monitor their internal operation on a real-time basis.

SUMMARY OF INVENTION

A system and method to monitor client sessions within a Java virtual machine is described herein. Client sessions are established within an application server instance to store session context data for each of the client sessions during the client sessions. At least two Java virtual machines are operated within the application server instance to service client requests received from clients associated with each of the client sessions. Status information about each of the client sessions is reported into shared memory external to the Java virtual machines to monitor each of the client sessions during operation of the Java virtual machines.

In one embodiment, the session context data corresponding to at least a portion of the client sessions is saved to a backup store between request/response cycles and the status information including a designation of the backup store is reported into the shared memory.

In one embodiment, the client sessions are terminated when they are determined no longer to persist. In addition, the session context data corresponding to the terminated client session is cleaned from the backup store and the shared memory is cleaned of the status information corresponding to the terminated client session.

In one embodiment, the status information about the client sessions is retrieved from the shared memory and transmitted to a monitoring console to display the status information thereon.

Embodiments of the invention may include all or some of the above described features. The above features can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 4 is a table illustrating examples of session status information that can be reported into shared memory, in accordance with an embodiment of the invention.

DETAILED DESCRIPTION

Figure 1:
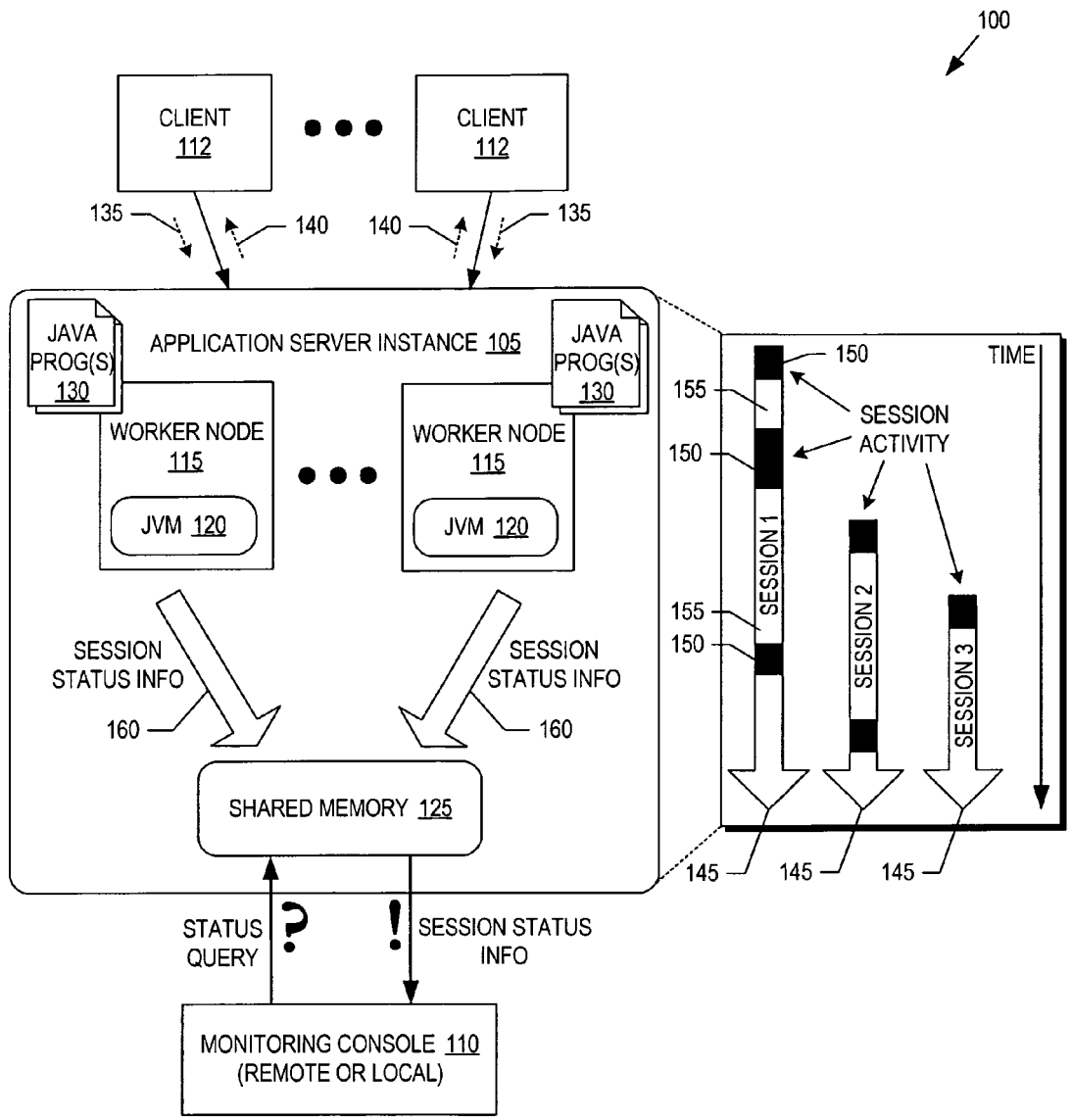
FIG. 1 is a block diagram illustrating a software system for monitoring client sessions within multiple Java virtual machines of an application server instance, in accordance with an embodiment of the invention.

FIG. 1 is a block diagram illustrating a software system 100 for monitoring client sessions within multiple Java virtual machines ("JVMs") of an application server ("AS") instance 105, in accordance with an embodiment of the invention. The illustrated embodiment of software system 100 includes AS instance 105, monitoring console 110, and clients 112. The illustrated embodiment of AS instance 105 includes one or more worker nodes 115 each including a JVM 120, and shared memory 125. Worker nodes 115 provide the runtime environment for JVMs 120, which in turn interpret/execute Java programs 130.

In one embodiment, AS instance 105 is a web application server, such as Web AS by SAP, .NET by Microsoft, or the like. In one embodiment, AS instance 105 represents a Java 2 Platform, Enterprise Edition ("J2EE") instance for providing enterprise software functionality. It should be appreciated that various components of AS instance 105 have been excluded from FIG. 1 for the sake of clarity and so as not to obscure the invention. Although FIG. 1 illustrates two worker nodes 115 within AS instance 105, more or less worker nodes 115 may be established within AS instance 105.

During operation, client requests 135 may be received at AS instance 105 and assigned to any of worker nodes 115 for servicing. JVMs 120 may execute Java programs 130 containing logic for servicing client requests 135. An example client request 135 may include a request to retrieve a name and address from a database and provide the name and address to the requesting one of clients 112 for display thereon. Responses to client requests 135 are provided to clients 112 as server responses 140. A client request 135 and corresponding server response 140 is called a request/response cycle.

Upon assigning a first client request 135 to one of worker nodes 115 for processing, the designated worker node 115 commences a client session, such as one of client sessions 145, to store session context data for the communications with the particular client 112. A client session 145 is a series of interactions between two communication end points (e.g., JVM 120 and clients 112) that occur during the span of the connection. Typically, one of the end points requests a connection with the other end point who then agrees to the connection. Each client session 145 begins when the connection is established at both ends and terminates when the connection is ended. Client sessions 145 may also be thought of as containers for Java objects created by each JVM 120 while executing Java programs 130 to service client requests 135. These containers allow each worker node 115 to maintain the session context data (e.g., the Java objects) from one request/response cycle to the next so that communication context can persist for multiple request/response cycles to provide stateful communications.

As illustrated, each client session 145 may include active periods 150 and idle periods 155. Active periods 150 may include one or more continuous request/response cycles, while idle periods 155 represent idle connection time between adjacent request/response cycles. Each JVM 120 may maintain zero, one, or more client session 145 at any given time.

In one embodiment, while servicing/processing client requests 135, worker nodes 115 are capable of reporting session status information 160 about client sessions 145 into shared memory 125. Reporting session status information 160 may be event based, such as at the beginning or end of a request/response cycle.

Once session status information 160 is reported into shared memory 125, monitoring console 110 can query shared memory 125 to display session status information 160 for review by an Information Technology ("IT") technician. Monitoring console 110 may be located locally on the same hardware machine executing AS instance 105, or advantageously, executed on a remote machine couple to a network. Monitoring console 110 may further monitor an entire cluster of AS instances 105, all from a single remote machine. Using monitoring console 110, the IT technician can remotely monitor the status and operational health of client sessions 145 within each JVM 120 in real-time to ensure AS instance 105 remains in a healthful state. Shared memory 125 working in concert with monitoring console 110, enables the IT technician to make informed decisions when taking preventative and/or remedial action to effectively maintain and manage an enterprise system.

Figure 2:
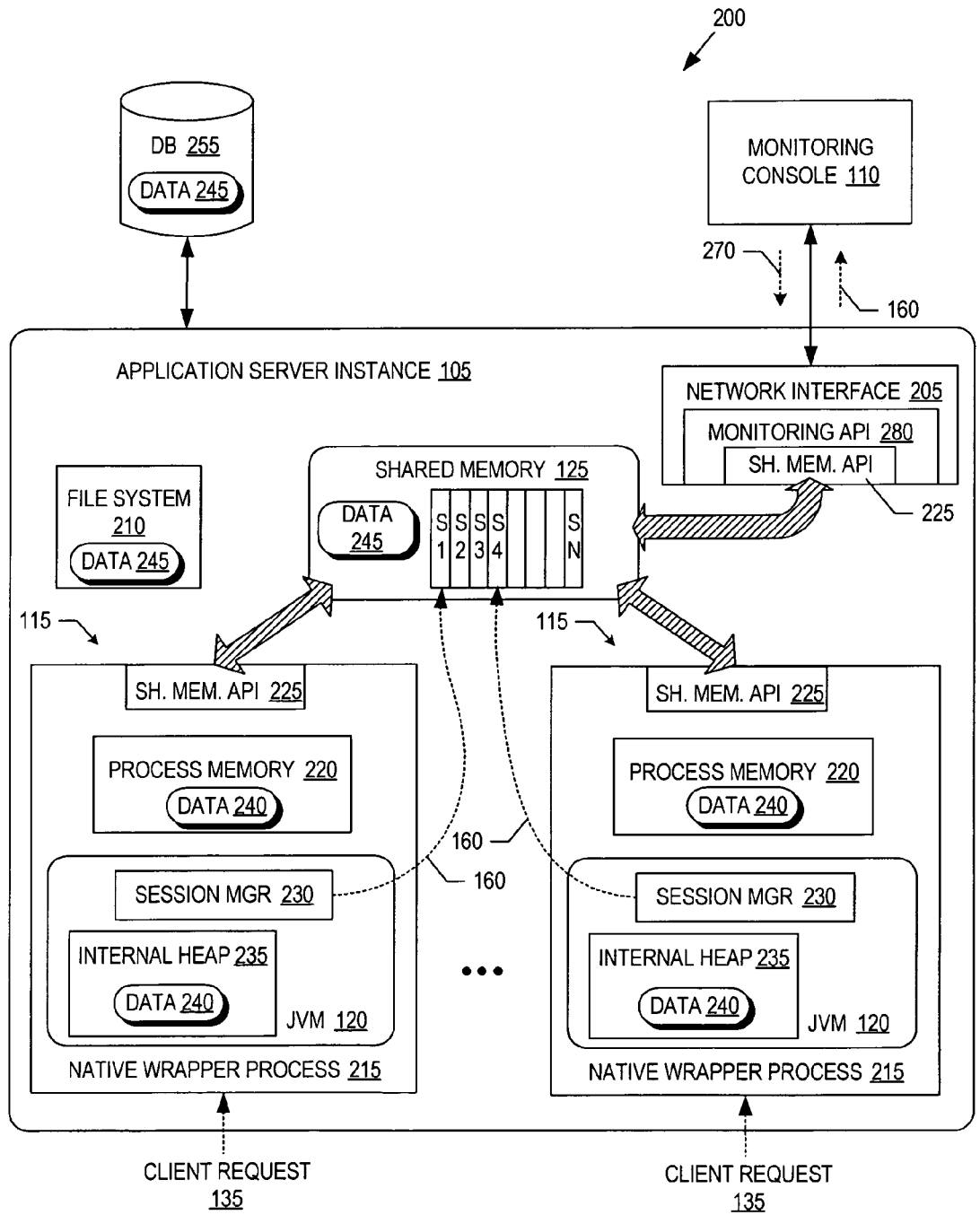
FIG. 2 is a block diagram illustrating a software system for storing session status information into shared memory and reporting the session status information to a monitoring console, in accordance with an embodiment of the invention.

FIG. 2 is a block diagram illustrating a software system 200 for storing session status information 160 into shared memory 125 and reporting session status information 160 to monitoring console 110, in accordance with an embodiment of the invention. FIG. 2 provides further detail of AS instance 105, including a network interface 205 and file system 210, as well as, worker nodes 115 and shared memory 125. As illustrated, each worker node 115 includes a native wrapper process 215 providing the runtime environment for a JVM 120. The native wrapper process 215 further includes allocated process memory 220 and a shared memory application programming interface ("API") 225 for accessing shared memory 125. The illustrated embodiment of each JVM 120 includes a session manager 230 and an internal heap 235. It should be appreciated that various components and subcomponents of AS instance 105 have been excluded from FIG. 2 for the sake of clarity and so as not to obscure the invention. In one embodiment compliant with the J2EE standard, native wrapper process 215 is often referred to as the "JLaunch" process.

Session manager 230 creates a new client sessions 145 in response to a first client request 135 when establishing a connection with AS instance 105. Once a client session 145 is created, session manager 230 is further responsible for managing client sessions 145 and reporting session status information 160 about the client sessions 145 into shared memory 125. In one embodiment, session manager 230 is a Java program (e.g., one of Java programs 130) that is interpreted and executed within JVM 120.

Upon creation of a new client session 145, session manager 230 registers a reporting slot within shared memory 125 to store session status information 160 corresponding to the new client session 145. In one embodiment, all future generated session status information 160 for the new client session 145 is reported into the same reporting slot. As illustrated, shared memory 125 may contain a number of reporting slots S1-SN, each corresponding to a single client session 145 persisting on one of JVMs 120. Upon termination of one of client session 145, its corresponding reporting slot may be cleaned (e.g., deleted) and the memory recycled for use by another client session 145 when created.

As mentioned above, client sessions 145 act as a sort of container for session context data (e.g., Java objects) generated during the course of client sessions 145. During active periods 150 of client sessions 145, the session context data may be stored within internal heap 235 of JVM 120 or within process memory 220 of native wrapper process 215 supporting JVM 120 as session context data 240. Storing session context data 240 locally enables quick access time to the data and objects therein during processing of client requests 135. During idle periods 155 of client sessions 145, session context data 240 may be transferred to a backup store, as session context data 245. Transferring the session context data to a backup store recycles the limited resources of internal heap 235 and/or process memory 220, thereby enabling each worker node 115 to maintain many open client sessions 145. When a client session 145 is active, the session context data may be transferred into local memory for use by the particular JVM 120. When a client session 145 is idle or inactive, but the connection between the end points has not been terminated, the session context data may be transferred out of local memory to a backup store for later recall. In some cases, one or more client sessions 145 may persist no longer than the active period 150, in which case, the session context data is not persisted into a backup store.

Backup stores may include filing the session context data into a file system 210 of AS instance 105, serializing the session context data into a database 255 communicatively coupled to AS instance 105, serializing the session context data into shared memory 125, or even copying the session context data to a shared closure within shared memory 125.

Serializing the session context data includes converting the objects which make up the session context data into a byte stream which can then be transferred and stored into the backup store. A shared closure includes an enclosure of an initial object plus all objects referenced by the initial object. A shared closure groups all objects making up the session context data of a particular client session 145 together and allows them to be shared among multiple JVMs 120 when copied into shared memory 125.

Session manager 230 accesses shared memory 125 via shared memory API 225. In one embodiment, shared memory API 225 abstracts access to shared memory 125 through use of function calls. Session manager 230 makes a "call" to one or more functions published internally to its worker node 115 by shared memory API 225. Session manager 230 then passes session status information 160 to the called function. In turn, the called function copies session status information 160 into an appropriate reporting slot S1-SN. In one embodiment, shared memory API is implemented with dynamically linked libraries ("DLLs"). In an embodiment where JVM 120 is compliant with the J2EE standard, shared memory API 225 is a software layer implemented using the Java Native Interface ("JNI") APIs. In a Microsoft JVM embodiment, shared memory API 225 is a software layer implemented using the Raw Native Interface ("RNI").

In one embodiment, monitoring console 110 transmit a status query 270 to network interface 205 to request session status information 160, or a portion thereof. Monitoring console 110 can be implemented using the Microsoft Management Console ("MMC"), while network interface 205 may be implemented with a WebService based Start Service. In one embodiment, status query 270 is conveyed to network interface 205 using a message based protocol, such as Simple Object Access Protocol ("SOAP") employing extensible markup language ("XML") syntax to send text commands over the HyperText Transport Protocol ("HTTP"). Status query 270 may be transmitted to AS instance 105 automatically on a periodic basis, in response to a specified event, or in response to a screen refresh request by an IT technician.

Upon receipt, status query 270 is passed to a monitoring API 280 within network interface 205. Monitoring API 280 accesses the requested portions of shared memory 125 via its own copy of shared memory API 225. Once monitoring API 280 retrieves the requested portions of session status information 160 from shared memory 125, session status information 160 is conveyed to monitoring console 110. In one embodiment, XML syntax is used to convey session status information 160 to monitoring console 110.

Monitoring console 110 may further format the received session status information 160 and render it to a screen for review by an IT technician. Monitoring console 110 may display session status information 160 received from a number of AS instances 105 to monitor an entire cluster of AS instances 105. Monitoring console 110 may further optionally generate log files to maintain long-term status reports on each AS instance 105 being monitored.

In addition to issuing status request 270, monitoring console 110 may negotiate a reporting contract with network interface 205 to serve up session status information 160 on a regular or periodic basis, without need of status request 270. As such, network interface 205 may be capable of pushing session status information 160 to monitoring console 110, as well as, monitoring console 110 pulling session status information 160 from network interface 205.

Figure 3:
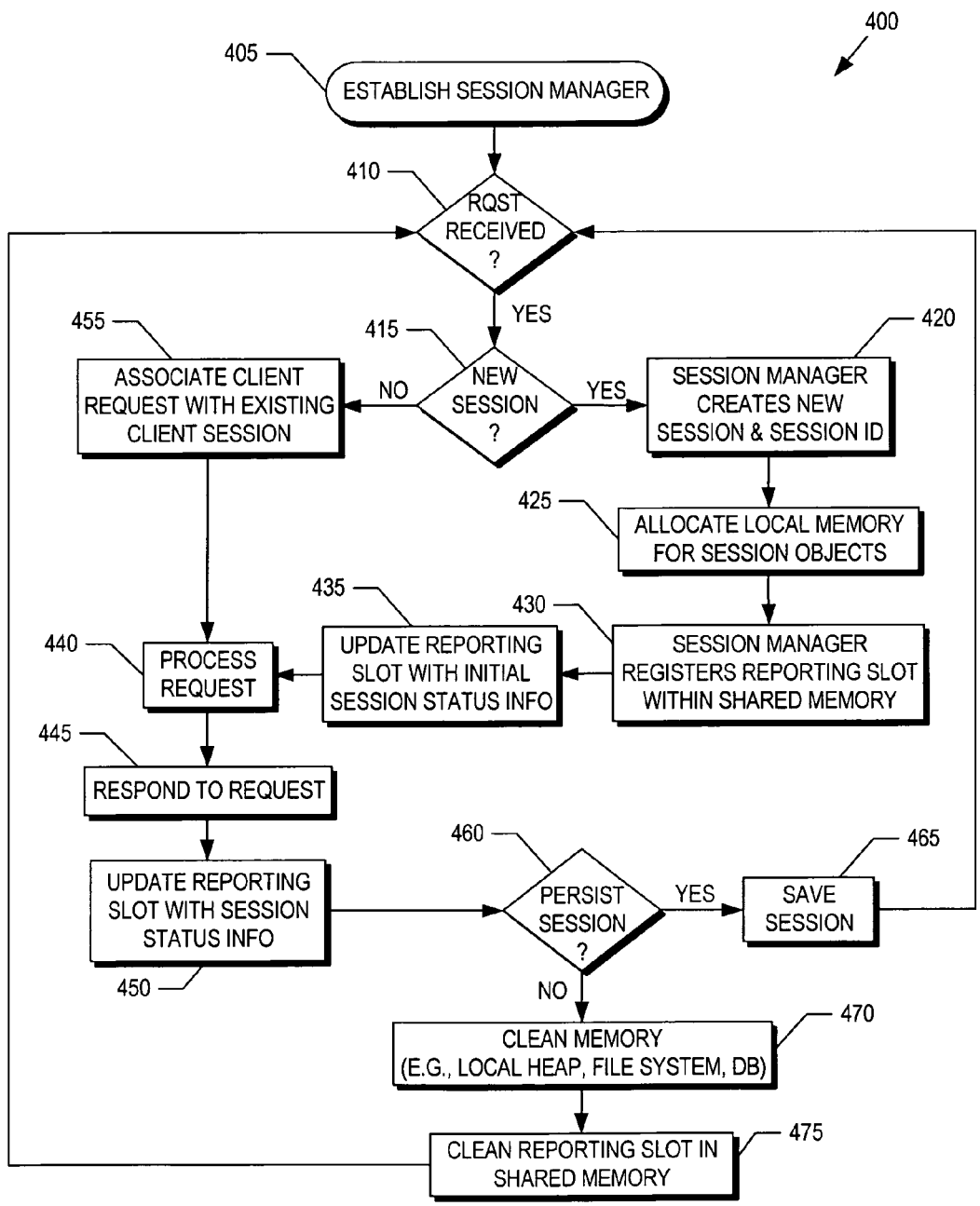
FIG. 3 is a flow chart illustrating a process for monitoring client sessions within a Java virtual machine, in accordance with an embodiment of the invention.

FIG. 3 is a flow chart illustrating a process 300 for monitoring client sessions 145 within a JVM 120, in accordance with an embodiment of the invention. In a process block 405, session manager 230 is loaded and executed by JVM 120. In one embodiment, session manager 230 is a Java object interpreted by JVM 120. Once session manager 230 is established, AS instance 105 is ready to receive and service client requests 135.

When one of client requests 135 is received at AS instance 105 (decision block 410), the received client request 135 is assigned to one of worker nodes 115 and its associated JVMs 120 for processing. If the received client request 135 is not associated with an existing client session 145 (decision block 415), then process 400 continues to a process block 420. In process block 420, session manager 230 creates a new client session 145 and assigned a new session ID to the new client session 145. In a process block 425, local memory is allocated for the new client session. The local memory is allocated to store session context data 240 (e.g., Java objects, etc.) generated during servicing the client request. The allocated local memory may include one or both of process memory 220 and/or internal heap 235. In a process block 430, session manager 230 registers a new reporting slot within shared memory 125 to store session status information 160 as it is generated. In a process block 435, session manager 230 reports initial session status information 160 into the registered reporting slot. Initial session status information 160 may include status information such as the session ID, creation time of the client session, a username of the client 112 that issued the particular client request 135, increment a client request counter for the client session, and the like.

In a process block 440, JVM 120 processes the client request 135 and generates a server response 140 (process block 445) once processing is complete. After generating server response 140, a request/response cycle has completed and session manager 230 again updates the reporting slot with new session status information 160 (process block 450). Session status information 160 reported in process block 450 may include status information such as, an identification of whether session context data 240 will be persisted and an identification of which backup store the session context data 240 will be persisted into, a size of the session container, a last update timestamp, and the like.

FIG. 4 illustrates a table 400 including examples of session status information 160 that may be reported into shared memory 125, in accordance with an embodiment of the invention. It should be appreciated that table 400 is not intended to be an exhaustive list of possible session status information 160, but rather examples of such information.

As illustrated, session status information 160 may include an indication of the backup store into which session context data is to be persisted during idle periods 155 between request/response cycles. This indication may include any of "BS_NONE" meaning the client session is not to be persisted into a backup store, "BS_FILE" meaning the client session is persisted to file system 210, "BS_DATABASE" meaning the client session is persisted to database 245 (e.g., via serialization of the Java objects), "BS_SHMEM" meaning the client session is persisted to shared memory 125, and "BS_SHCLOSURE" meaning the client session is persisted as a shared closure within shared memory 125 or other memory shared by other worker nodes 115. Table 400 further illustrates examples of other session status information 160 with the tag identifiers (e.g., SIZE, TIMEOUT, TOTAL_REQUESTS, TOTAL_RESPONSES, CREATION_TIME, UPDATE_TIME, SESSION_CORRUPT, SESSION_AVAILABLE, USERNAME, SESSION_ID) listed in the left column and corresponding self-explanatory descriptions in the right column.

Returning to decision block 415 in FIG. 3, if the received client request 135 is associated with an existing client session 145, then process 400 continues to a process block 455. In process block 455, session manager 230 associates the received client request 135 with its existing client session 145. If the existing client session is still buffered within internal heap 235 or process memory 220, then associating the client request with its existing client session requires no extra steps other than a logical association between the client request and the session context data 240. However, if the existing client session was backed up into any of shared memory 125, file system 250, or database 255, then session context data 245 is retrieved from the particular backup store and buffered into local memory (e.g., process memory 220 or internal heap 235). Subsequently, process 400 continues through process blocks 440 to 450 as described above.

In a decision block 460, it is determined whether the current client session is to be persisted into a backup store. If the current client session is to be persisted, then process 400 continues to a process block 465. In process block 465, the current client session is saved by copying session context data 240 to one of the backup stores. After the client session is saved, process 400 returns to decision block 410 to await a new client request 135.

Returning to decision block 460, if the current client session is not to persist, then the current client session is terminated and process 400 continues to a process block 470. Terminating the current client session means that either one or both of the JVM 120 and the client 112 originating the client request 135 severed the connection between the two end points. A connection may be severed at the end of a request/response cycle by AS instance 105 and/or client 112 or after a timeout has occurred during one of idle periods 155. In process block 470, both the backup store, if one exists, and the local memory (e.g., internal heap 240 or process memory 220) are cleaned (e.g., deleted) of session context data 245 and 240 to reclaim memory. In a process block 475, session manager 230 cleans the reporting slot of the terminated client session 145 within shared memory 125, again to reclaim memory. Once the backup store and shared memory 125 have been cleaned, process 400 returns to decision block 410 to await a new client request 135.

It should be appreciated that each JVM 120 may be multi-threaded and as such capable of receiving and processing multiple client requests 135 in a parallel or quasi-parallel manner. Therefore, process 400 may be executed in parallel within each JVM 120 for multiple client requests 135 assigned to a single worker node 115.

Figure 5:
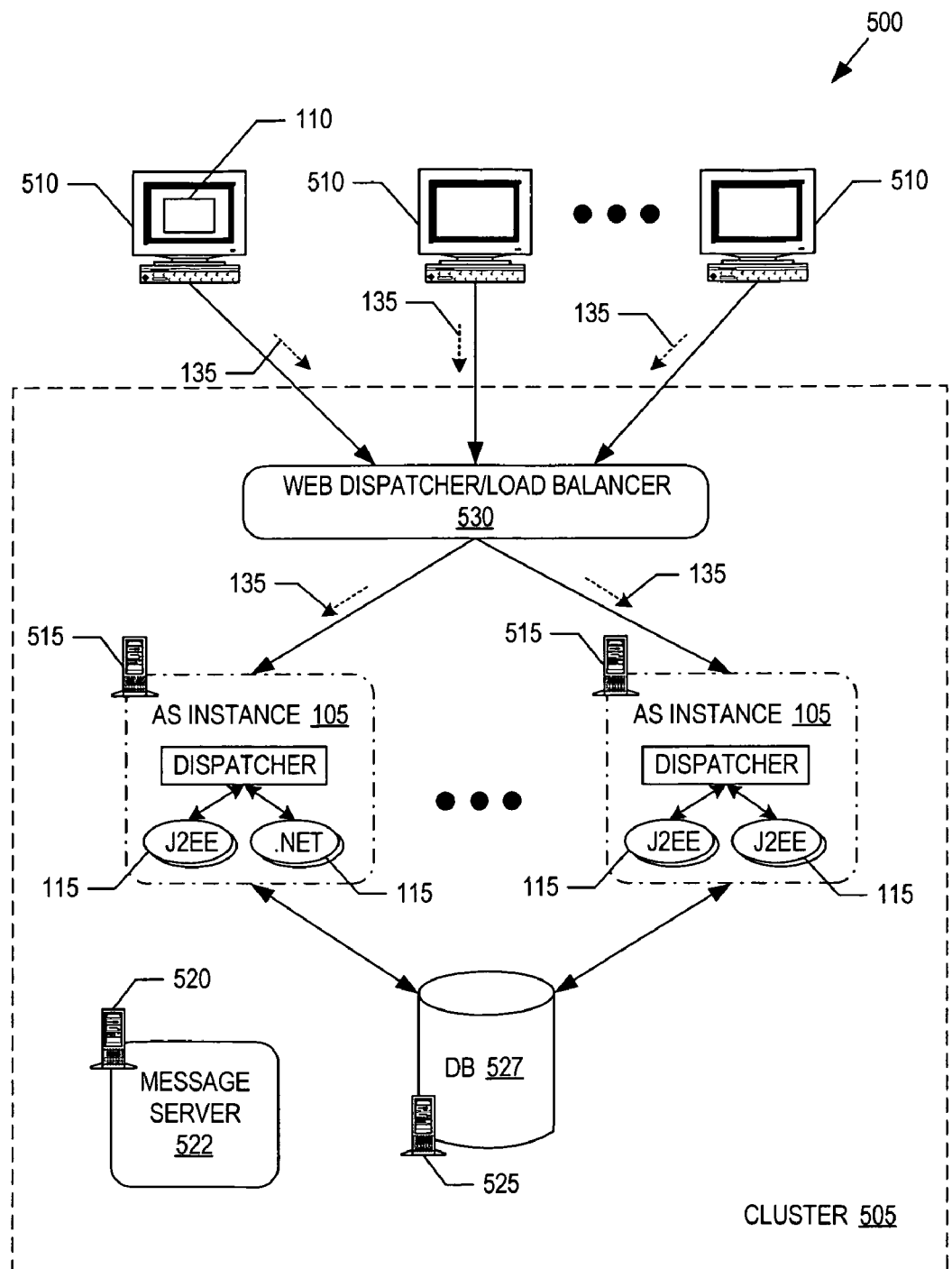
FIG. 5 is a block diagram illustrating a demonstrative enterprise environment for implementing embodiments of the invention.

FIG. 5 is a block diagram illustrating a demonstrative enterprise environment 500 for implementing embodiments of the invention. The illustrated embodiment of enterprise environment 500 includes a cluster 505 coupled to service client requests 135 from client nodes 510. Cluster 505 may include one or more server nodes 515 each supporting one or more AS instances 105, a message server node 520 supporting a message server 522, a database node 525 supporting a database 527, and a web dispatcher 530.

AS instances 105 may be web application servers, such as Web AS by SAP, .NET by Microsoft, or the like. As discussed above, each AS instance 105 may include one or more worker nodes 115 to execute Java programs 130 and service client requests 135. It should be appreciated that various components of AS instances 105 have been excluded from FIG. 5 for the sake of clarity and so as not to obscure the invention. In one embodiment, worker nodes 115 may be compliant with the J2EE standard. In one embodiment, worker nodes 115 may be compliant with the .NET framework from Microsoft. Each AS instance 105 may even include worker nodes 115 compliant with both the J2EE standard and the NET framework.

Web dispatcher 530 implements a load-balancing mechanism distributing client requests 135 from client nodes 510 among server nodes 515 within cluster 505. For example, web dispatcher 530 may implement a round-robin load-balancing mechanism or the like. Web dispatcher 530 may be one of server nodes 515 having the task of dispatching client requests 135 among server nodes 515 of cluster 505 or a stand alone hardware node. Client requests 135 are processed by server nodes 515 and may subsequently be provided to database node 525. Database node 525 offers up the requested data to server nodes 515, which in turn process and format the results for display on client nodes 510. Each AS instance 105 may further include its own dispatcher mechanism to distribute client requests 135 assigned to it among its individual worker nodes 115.

Java programs 130 (see FIG. 1) executed by worker nodes 115 within AS instances 105 may collectively provide the logic for implementing various sub-layers (e.g., business layer, integration layer, presentation layer, etc.) of AS instances 105. For example, Java programs 130 may be servlets providing server-side logic to generate graphical user interfaces ("GUIs") on clients nodes 510 and may further include JavaServer Page ("JSP") extensions for providing dynamic content within the GUI. Java programs 130 may further include business applications providing the business logic of an Enterprise JavaBean ("EJB"), and on client nodes 510 may be applets providing client side logic, and the like.

One of client nodes 510 may execute monitoring console 110 to provide remote monitoring of AS instances 105, and in particular, remote monitoring of each client session 145 within each of JVMs 120. If an IT technician notices that one of the client sessions 145 has been idle or available too long, consuming an unusually large amount of resources, or otherwise errant, the IT technician can take appropriate action including terminating the errant client session 145 or resetting the problematic JVM 120 sustaining the errant client session 145.

Figure 6:
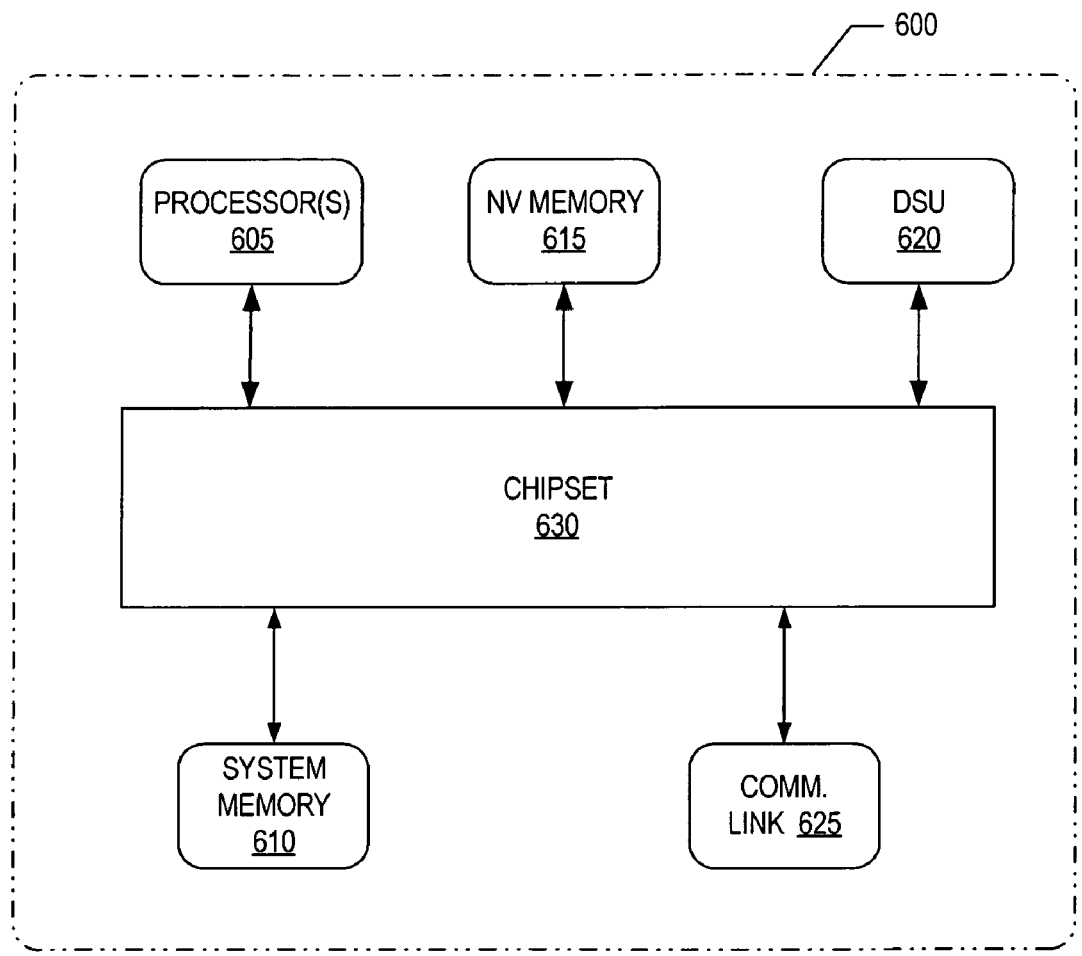
FIG. 6 illustrates a demonstrative processing system for implementing embodiments of the invention.

FIG. 6 is a block diagram illustrating a demonstrative processing system 600 for executing any of AS instance 105, monitoring console 110, process 500, or implementing any of client nodes 510, server nodes 515, message server node 520, or database node 525. The illustrated embodiment of processing system 600 includes one or more processors (or central processing units) 605, system memory 610, nonvolatile ("NV") memory 615, a DSU 620, a communication link 625, and a chipset 630. The illustrated processing system 600 may represent any computing system including a desktop computer, a notebook computer, a workstation, a handheld computer, a server, a blade server, or the like.

The elements of processing system 600 are interconnected as follows. Processor(s) 605 is communicatively coupled to system memory 610, NV memory 615, DSU 620, and communication link 625, via chipset 630 to send and to receive instructions or data thereto/therefrom. In one embodiment, NV memory 615 is a flash memory device. In other embodiments, NV memory 615 includes any one of read only memory ("ROM"), programmable ROM, erasable programmable ROM, electrically erasable programmable ROM, or the like. In one embodiment, system memory 610 includes random access memory ("RAM"), such as dynamic RAM ("DRAM"), synchronous DRAM, ("SDRAM"), double data rate SDRAM ("DDR SDRAM") static RAM ("SRAM"), and the like. DSU 620 represents any storage device for software data, applications, and/or operating systems, but will most typically be a nonvolatile storage device. DSU 620 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 620 is illustrated as internal to processing system 600, DSU 620 may be externally coupled to processing system 600. Communication link 625 may couple processing system 600 to a network such that processing system 600 may communicate over the network with one or more other computers. Communication link 625 may include a modem, an Ethernet card, a Gigabit Ethernet card, Universal Serial Bus ("USB") port, a wireless network interface card, a fiber optic interface, or the like.

It should be appreciated that various other elements of processing system 600 have been excluded from FIG. 6 and this discussion for the purposes of clarity. For example, processing system 600 may further include a graphics card, additional DSUs, other persistent data storage devices (e.g., tape drive), and the like. Chipset 630 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 630. Correspondingly, processing system 600 may operate without one or more of the elements illustrated. For example, processing system 600 need not include DSU 620.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Process 300 explained above is described in terms of computer software and hardware. The techniques described may constitute machine-executable instructions embodied within a machine (e.g., computer) readable medium, that when executed by a machine will cause the machine to perform the operations described. Additionally, process 300 may be embodied within hardware, such as an application specific integrated circuit ("ASIC") or the like. The order in which some or all of the process blocks appear in process 300 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method implemented in a network for monitoring client sessions, comprising:
    establishing client sessions within an application server instance, wherein each of the client sessions is established by a respective worker node in a plurality of worker nodes, each worker node providing a runtime environment for a respective Java virtual machine ("JVM") of a plurality of JVMs in the application server instance;
    storing by each of the plurality of JVMs session context data for a respective one of the client sessions during the client sessions;
    operating each of the plurality of JVMs to service a respective client request received from a client associated with one of the client sessions; and
    each of the plurality of JVMs reporting status information about one of the client sessions into a shared memory external to the plurality of JVMs, the reporting to monitor each of the client sessions during operation of the JVMs.

2. The method of claim 1, wherein establishing the client sessions comprises establishing connections between the clients and the JVMs to receive the client requests and to transmit corresponding server responses.

3. The method of claim 2, wherein operating the JYMs to service the client requests comprises: executing Java programs on the JVMs;
    processing the client requests based on logic of the Java programs to generate results, wherein the session context data includes Java objects created during processing the client requests; and
    generating the server responses to the client requests based at least in part on the results.

4. The method of claim 1, wherein reporting the status information about the client sessions into the shared memory comprises:
    registering a reporting slot within the shared memory for each of the client sessions; and
    reporting the status information about each of the client sessions into a corresponding one of the reporting slots.

5. The method of claim 4, wherein reporting the status information about each of the client sessions into the corresponding one of the reporting slots comprises reporting at least a portion of the status information about each of the client sessions into the corresponding one of the reporting slots in response to at least one of a commencement and a completion of a request/response cycle.

6. The method of claim 1, wherein the status information corresponding to one of the client sessions includes at least one of a size of the one of the client sessions, a timeout period, a count of the client requests received for the one of the client sessions, a creation timestamp, a last update timestamp, a name of the one of the clients corresponding to the one of the client sessions, and a session ID for the one of the client sessions.

7. The method of claim 1, further comprising:
    saving the session context data corresponding to at least a portion of the client sessions to a backup store between request/response cycles; and
    reporting the status information including a designation of the backup store into the shared memory.

8. The method of claim 7, further comprising:
    terminating one of the client sessions when the one of the client sessions no longer persists;

cleaning the backup store of session context data corresponding to the terminated client session; and
cleaning the shared memory of the status information corresponding to the terminated client session.

9. The method of claim 7, wherein the designation of the backup store includes a designation of one of: the client session not persisted, a file system, a database, the shared memory, and a shared closure.

10. The method of claim 1, further comprising:
retrieving the status information about the client sessions from the shared memory; and
transmitting the status information to a monitoring console to display the status information in a user readable format.

11. A machine-readable storage medium having stored executable instructions to cause a machine to perform operations comprising:
receiving client requests at an application server ("AS") instance;
associating each of the client requests with a respective client session and a Java virtual machine ("JVM") from among a plurality of client sessions and a plurality of JVMs maintained within the AS instance, wherein each of the plurality of client sessions is established by a respective worker node in a plurality of worker nodes within the AS instance, each worker node providing a runtime environment for a respective one of the plurality of JVMs;
responding to each of the client requests with a respective response of an associated JVM; and
each of the JVMs reporting session status information about a respective client session into shared memory, the shared memory shared by the plurality of JVMs to monitor the plurality of client sessions during operation of the plurality of JVMs.

12. The machine-readable storage medium of claim 11, wherein each of the JYMs reporting session status information into the shared memory comprises:
registering reporting slots within the shared memory for each of the plurality of client sessions; and
reporting the status information about each client session into a corresponding one of the reporting slots.

13. The machine-readable storage medium of claim 11, wherein the status information about one of the plurality of client sessions includes at least one of a size of the client session, a timeout period for the client session, a count of the client requests received for the client session, a creation timestamp of the client session, a last update timestamp for the client session, a name of a client generating the client requests, and a session ID for the client session.

14. The machine-readable storage medium of claim 11, the operations further comprising:
saving session context data for one of the client sessions to a backup store; and
reporting the session status information including a designation of the backup store into the shared memory.

15. The machine-readable storage medium of claim 14 the operations further comprising:
terminating a client session when the client session is determined no longer to persist;
cleaning the backup store of the session context data; and
cleaning the shared memory of the session status information for the terminated client session.

16. A system to implement a monitoring of client sessions in a network, the system comprising:
a server node including a processor to execute an application server ("AS") instance, the AS instance including logic executable by a processor of the server node to:
receive client requests at the AS instance from a client;
associate each of the client requests with a respective client session and a Java virtual machine ("JVM") from among a plurality of client sessions and a plurality of JVMs maintained within the AS instance, wherein each of the plurality of client sessions is established by a respective worker node in a plurality of worker nodes, each worker node providing a runtime environment for a respective one of the plurality of JVMs;
respond to each of the client requests with a respective response of an associated JVM; and
report session status information from each of the JVMs about a respective client session into shared memory, the shared memory shared by the plurality of JVMs to monitor the plurality of client sessions during operation of the plurality of JVMs.

17. The system of claim 16, wherein reporting the session status information into the shared memory comprises reporting the session status information into the shared memory in response to at least one of a commencement and a completion of a request/response cycle.

18. The system of claim 17, wherein reporting the session status information into the shared memory comprises:
registering reporting slots within the shared memory for each of the plurality of client sessions including the client session; and
reporting the status information about each of the client sessions into a corresponding one of the reporting slots.

19. The system of claim 16, wherein the AS instance further includes logic executable by the processor of the server node to:
save session context data for a client session to a backup store; and
report the session status information, including a designation of the backup store, into the shared memory.

20. The system of claim 16, further comprising a client node to execute a monitoring console, the monitoring console including logic executable by a processor of the client node to:
send a status query to the server node;
receive the session status information from the server node; and
display the session status information in a user readable format.

* * * * *